Patented Feb. 23, 1937

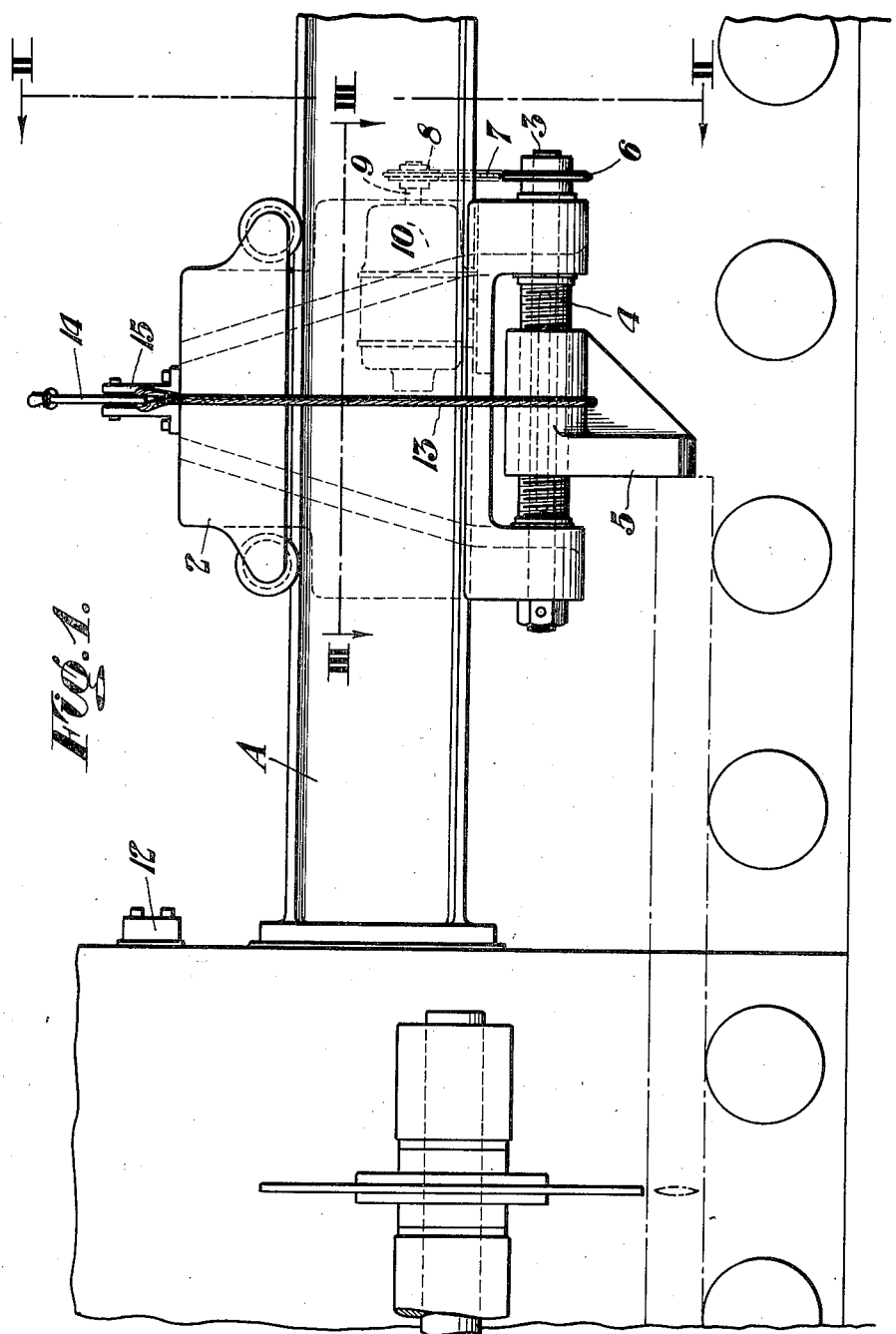

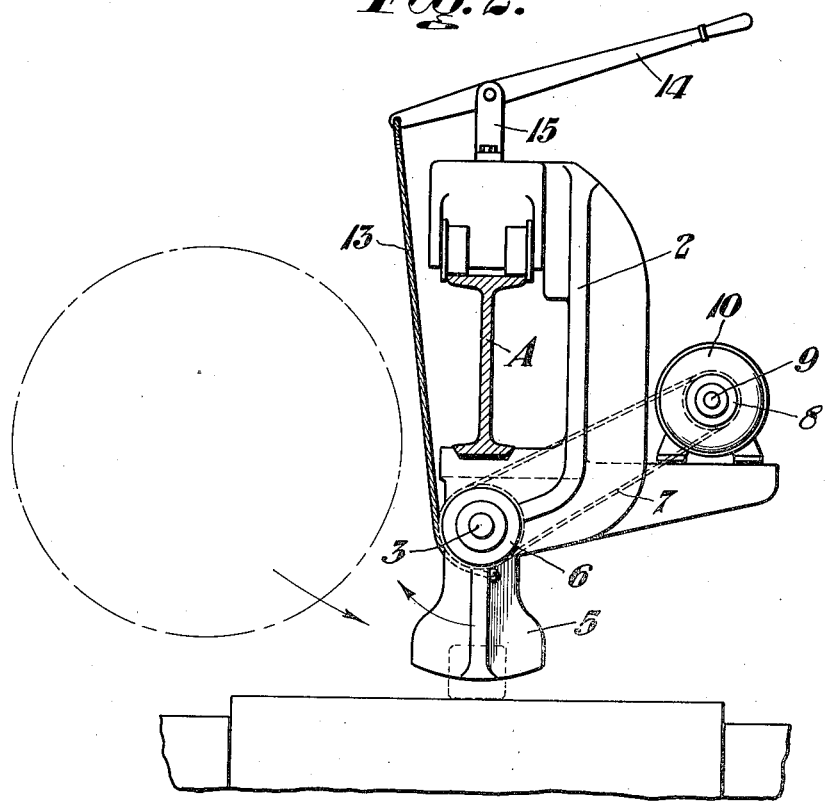
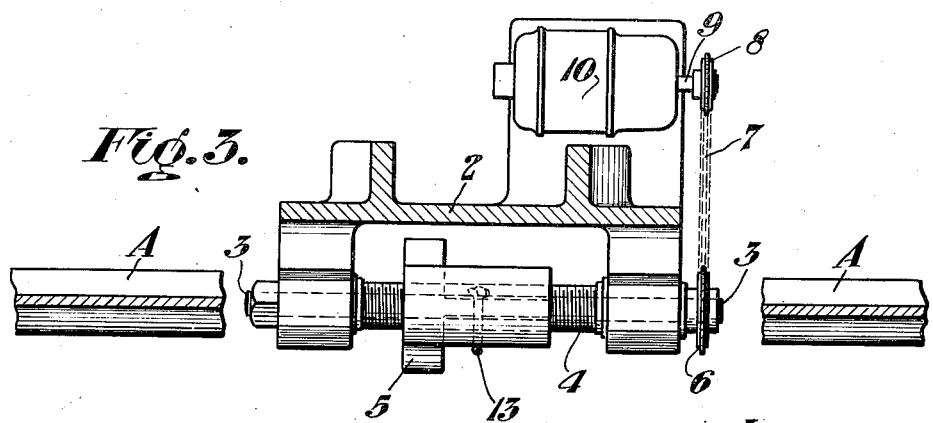

2,071,692

UNITED STATES PATENT OFFICE 2,071,692

ADJUSTABLE HOT SAW GAUGE

William W. Hill, Pittsburgh, Pa.

Application May 29, 1936, Serial No. 82,629

4 Claims. (Cl. 29—67)

The present invention relates to an adjustable hot saw gauge and consists in providing means adapted to make a quick adjustment of the gauge so as to expedite the cutting of material in predetermined lengths.

An object of the present invention is to provide an adjustable stop, mounted on a gauge frame and adapted for transverse movement thereon with suitable driving connections to a motor which permits a quick adjustment of the stop along the shaft so as to properly position the material at the predetermined score line under the cutting device.

With these and other advantages which will become apparent as the disclosure proceeds, Figure 1 is a side elevation of the saw gauge in working position, Figure 2 is a section on line II—II of Figure 1, looking in the direction of the arrows, and Figure 3 is a section on line III—III of Figure 1, in the direction of the arrows.

In the drawings, A represents a conventional type saw beam projecting from the saw machine and mounted for sliding movement thereon, is a saw gauge frame 2. Mounted between depending arms on the gauge frame is a shaft 3 having keyed thereto a screw collar 4 on which is threadedly mounted a stop 5.

A sprocket 6 is keyed to rotate with the shaft 3 and cooperates through suitable driving connections 7 with a sprocket 8 secured on the end of the motor shaft 9. Suitable connections from the motor 10 to a push button 12 afford means to positively move, when the circuit is closed, the stop in either a forward or reverse direction, depending upon the requirements necessary to properly position the score line of the material to be cut under the saw for subsequent cutting. Such an adjustment is independent of the movement of the gauge frame 2 and affords a positive movement of the stop 5 which functions to make minor adjustments of the stop to bring the material, to be cut, in proper cutting position. By such a construction, the stop 5 remains positive in its adjusted position until moved again to meet conditions as they are presented.

Secured to stop 5 at its under side, is a connecting device or cable 13 extending upwardly and secured at its opposite end to a lever 14 which is pivotally supported on a bracket 15 mounted on the upper surface of the gauge frame 2. By operating the lever 14, the stop 5 revolves on the screw collar 4 to withdraw the same from the path of the cut material and thereby permit the material to move along the table to a cooling or loading point.

Considerable time is generally required to unclamp the gauge and move it along the gauge beam so as to properly adjust the length of the material to be cut and such a procedure tends to slow down production. In the production of die-rolled material, the bar is severed on suitable marks or score lines predeterminedly arranged rather than to uniform lengths and the saw gauge must be capable of quick adjustment of the bar beneath the cutting mechanism so as to permit economical production. The present invention permits a quick adjustment of the gauge stop to take care of the slight variation in length which may occur from piece to piece.

In operation, the gauge assembly, including frame 2 operating mechanism and stop 5, is clamped in the proper position on the gauge beam to give the maximum length of the sawed blank when the stop 5 is fully retracted, that is, away from the saw. The bars are rolled along the usual feeding table under the saw for severing the front end to present a smooth surface. The bar is then advanced to engage the stop 5. This may or may not bring the next score line directly under the saw. If the score line is not directly under the saw but a small distance therefrom, either to the right or left, then by operating the motor 10 through push button switch 12, the screw 4 is caused to rotate on the shaft 3, through the driving mechanism connected to the motor, and thereby move the stop 5 to present the score line on the bar in the proper position under the cutting device. The saw is then moved across the bar to make the desired cut and this operation is repeated until all of the blanks have been cut out of the bar.

While I have shown and described one specific embodiment of my invention, it will be understood that I do not wish to be limited thereto, since various modifications may be made without departing from the scope of my invention, as defined by the following claims.

I claim:

1. An adjustable hot saw gauge comprising a gauge frame, a shaft carried by said frame, a stop mounted on said shaft, supporting means for said gauge frame, said gauge frame movable on said supporting means for preliminary length adjustment, means on said frame adapted to obtain a positive movement of said stop along said shaft in either direction and means adapted to raise said stop out of the path of the material.

2. An adjustable hot saw gauge comprising a gauge frame, means for mounting said gauge frame on a support, said gauge frame movable on said support for preliminary length adjustment, a shaft carried by said frame, a threaded collar keyed to said shaft, an internally threaded stop on said collar, a motor mounted on said gauge frame and driving connections between said motor and shaft for advancing or retarding said stop along said collar.

3. An adjustable hot saw gauge comprising a gauge frame, means for mounting said gauge frame on a support, said gauge frame movable on said support for preliminary length adjustment, a shaft carried by said frame, a threaded collar keyed to said shaft, an internally threaded stop on said collar, a motor mounted on said gauge frame, driving connections between said motor and shaft for advancing or retarding said stop along said collar and means adapted to remove said stop out of the line of travel of the material.

4. An adjustable hot saw gauge comprising a gauge frame, means for mounting said gauge frame on a support, said gauge frame movable on said support for preliminary length adjustment, a shaft carried by said frame, a threaded collar keyed to said shaft, an internally threaded stop on said collar, a motor mounted on said gauge frame, driving connections between said motor and shaft for advancing or retarding said stop along said collar, a lever pivotally mounted on the upper face of said gauge frame, a cable connection between said lever and stop whereby said stop may be withdrawn from the line of travel of the material.

WILLIAM W. HILL.